United States Patent [19]
Kosalos

[11] Patent Number: 5,530,678
[45] Date of Patent: Jun. 25, 1996

[54] REAL-TIME CALIBRATION ACOUSTIC ARRAY

[75] Inventor: James G. Kosalos, Kirkland, Wash.

[73] Assignee: Alliant Techsystems Inc., Edina, Minn.

[21] Appl. No.: 350,269

[22] Filed: Dec. 5, 1994

[51] Int. Cl.⁶ .................................................. H04B 17/00
[52] U.S. Cl. .......................................... 367/13; 367/155
[58] Field of Search ........................ 367/13, 155; 310/800

[56] References Cited

U.S. PATENT DOCUMENTS

| | | | |
|---|---|---|---|
| 4,217,516 | 8/1980 | Iinuma et al. | 367/150 |
| 4,517,665 | 5/1985 | DeReggi et al. | 367/153 |
| 4,789,971 | 12/1988 | Powers et al. | 367/152 |
| 4,833,360 | 5/1989 | Holly | 367/152 |
| 4,877,988 | 10/1989 | McGinniss et al. | 310/306 |
| 4,950,936 | 8/1990 | Rynne et al. | 367/155 |
| 4,959,992 | 10/1990 | Gentles | 367/13 |

FOREIGN PATENT DOCUMENTS

| | | |
|---|---|---|
| 2934-187 | 3/1981 | Germany . |
| 0862-398 | 9/1981 | U.S.S.R. . |

OTHER PUBLICATIONS

Preston, Roy C., "The NPL Ultrasound Beam Calibrator", *IEEE Transactions on Ultrasonics, Ferroelectrics, and Frequency Control*, vol. 35, No. 2, Mar. 1988, pp. 122–139.
Lewin, Peter A., et al., "Wide–Band Piezoelectric Polymer Acoustic Sources", *IEEE Transactions on Ultrasonics, Ferroelectrics, and Frequency Control*, vol. 35, No. 2, Mar. 1988, pp. 175–184.

*Primary Examiner*—Daniel T. Pihulic
*Attorney, Agent, or Firm*—Merchant, Gould, Smith, Edell, Welter & Schmidt

[57] ABSTRACT

A method and apparatus for acoustic array calibration. A housing with an opening on one side contains the acoustic transducer element. An acoustically transparent window covers the opening in the housing. A separate piece of substantially acoustically transparent planar transducer film is positioned in front of each transducer element. This film monitors the acoustic energy transmitted by the transducer elements, or alternatively transmits energy to the transducer elements. The transducer film can also operate as an independent hydrophone.

A method for calibrating acoustic arrays is also disclosed. The transducer film monitors the acoustic energy transmitted by each acoustic transducer. The level of transmitted acoustic energy is independently measured by external calibration equipment. The acoustic energy received by each transducer film is compared with that measured by the external equipment to determine a calibration factor for each transducer element. Further, the transducer film can be energized to send acoustic energy to the transducer elements. Again, the acoustic energy transmitted by the film and received by the transducer elements is compared to the energy transmitted by the external calibration equipment and received by the transducer elements to determine a calibration factor for each transducer element.

16 Claims, 3 Drawing Sheets

5,530,678

REAL-TIME CALIBRATION ACOUSTIC ARRAY

FIELD OF THE INVENTION

The present invention relates to a system for quantifying the performance of sonar systems, and more particularly, a system to monitor the transmitted wave shape and amplitude at different power levels, and the receiver sensitivity over a broad bandwidth, thus providing for the end-to-end testing of the entire sonar system on a real-time basis.

BACKGROUND OF THE INVENTION

In order to calibrate the performance of sonar systems, the transmitted wave patterns and amplitude, as well as the receive sensitivity of the transducer elements, must be measured in water and compared to measurements taken by calibration equipment. However, there are numerous practical limitations that interfere with the ability to accurately measure the performance of the sonar system.

Larger sonar arrays tend to be many wavelengths across the front of the array. In order to quantify the performance of the array, measurements must be taken at a substantial distance from the array. Larger arrays require the measurements to be taken up to a kilometer away, necessitating an extremely large testing facility.

Sonar array calibration must also take into consideration complicated environmental variations that are regularly encountered in the field. For example, refraction and attenuation can be affected by the salinity and temperature changes of the water. Further, the characteristics of the array may change slightly over time. The sensitivity of the ceramic transducer can change with age. Electronics driving the acoustic array and interpreting the received signal may also drift over time. From a fault tolerance standpoint, it is important to monitor individual elements in the array for possible malfunctions.

The present invention relates to system and method for determining a calibration factor for acoustic arrays in a laboratory against a known standard and then applying the calibration factor in real-time to determine if the array and/or the system to which it is attached has maintained its expected level of performance.

SUMMARY OF THE INVENTION

The present invention relates to a method and apparatus for acoustic array and/or sonar system calibration. An optional housing with an opening on one side contains at least one acoustic transducer element. An acoustically transparent window covers the opening in the housing. A separate piece of substantially acoustically transparent planar transducer film is positioned in front of each transducer element to monitor the acoustic energy transmitted by the transducer elements, and to transmit acoustic energy that is to be received by the transducer elements.

A housing is not required for the present invention or associated with the apparatus or method. Alternatively, the transducer film may be embedded in an acoustically transparent material, such as a potting material. A corresponding sensitive element is at least partially retained in the material so that the transducer film is positioned proximate the sensitive element.

The method for calibrating the acoustic array of the present invention includes two possible approaches. First, the transducer element is energized to produce acoustic energy. The separate pieces of transducer film located in front of each transducer element monitor the acoustic energy transmitted by each acoustic transducer. The level of transmitted acoustic energy is also independently measured by calibration equipment. The acoustic energy detected by each transducer film is compared with the energy transmitted by its corresponding acoustic transducer. A transmission calibration factor for each transducer element at various levels of transmitted acoustic energy is determined, as measured by the calibration equipment.

Second, the transducer film can be energized to transmit acoustic energy which is received by the acoustic transducer operating as a hydrophone. The signal transmitted by the transducer film is received by the acoustic transducer and compared to the signal received at the transducer from external calibration equipment. A comparison of the two signals relates the signal from the transducer film to that from the calibration equipment, thus implementing a built-in calibration capability.

Finally, the transducer film of the present invention can operate as an independent hydrophone.

DETAILED DESCRIPTION OF THE PREFERRED EMBODIMENT

Figure 1:
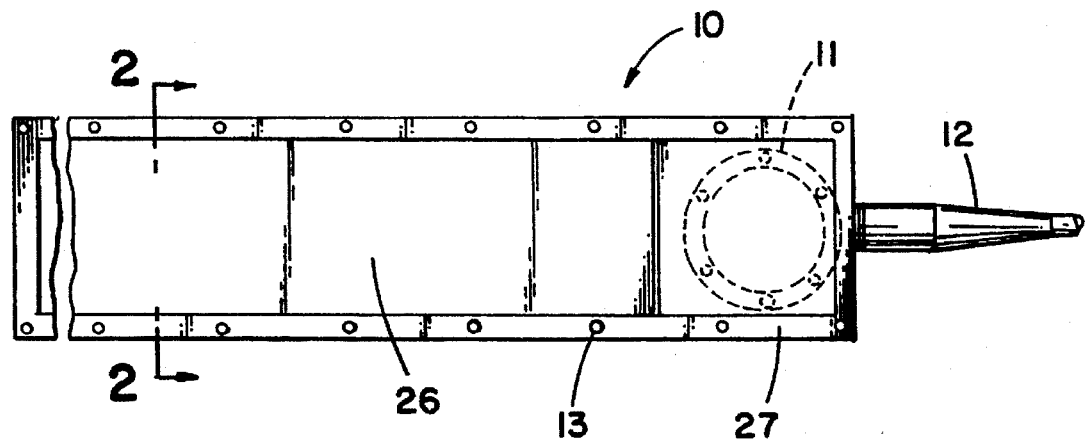
FIG. 1 is a top view of the acoustic array of the preferred embodiment of the present invention.

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

OVERVIEW

The preferred embodiment is directed to a real-time self-calibrating acoustic array with a built-in reference point for measuring both transmission and reception sensitivity of the transducer array.

The disclosed system preferably utilizes a separate piece of polyvinylidene fluoride (PVDF) film in front of each transducer element. The films are substantially acoustically transparent and thus do not affect either the transmit or receive performance of the array. The films monitor the acoustic energy transmitted by each transducer element and can transmit energy to be received by each element. The received levels can then be compared to reference data previously collected for the transducer elements under laboratory conditions.

The array is first calibrated under laboratory conditions. In the transmit mode, each transducer element is subjected to a voltage, creating acoustic energy which is independently measured by calibration equipment. The acoustic energy from the transducer element deforms the PVDF film located in front of the element, which creates a voltage. The ratio of the voltage generated by the PVDF film to the voltage placed across the transducer element determines a calibration factor for the various levels of acoustic energy, as measured by the calibration equipment. Calibration factors are collected over the entire bandwidth of the transducer element, and at different power levels. The calibration factors are used to accurately monitor the quantity of transmitted acoustic energy and the received sensitivity of the whole array in real time, whereby the absolute magnitude of backscatter from actual targets can be accurately measured.

A second aspect of the present system involves energizing the PVDF film and comparing its output with that of calibration equipment under laboratory conditions. The acoustic energy transmitted by the PVDF film will stimulate the transducer element, as will the energy transmitted by the external calibration equipment. Energy from the PVDF film and the energy from the external calibration equipment are received at the transducer element and compared. This procedure is preferably repeated at various power levels to determine calibration factors for the array.

Another aspect of the present invention involves using the PVDF film as an independent receiver or hydrophone, providing broader bandwidth capabilities for the array in the receive mode. Therefore, the structure of the present invention provides for a multi-spectral sonar array.

ACOUSTIC ARRAY

FIG. 1 illustrates a preferred acoustic array 10 consistent with the present invention. A connector 12 contains the signal leads (not shown) to operate the array 10. Acoustic window 26, made of acoustically transparent potting material, is held in place by screws 13 through a bezel 27. An access cover 11 is provided to facilitate assembly and repair.

Figure 2:
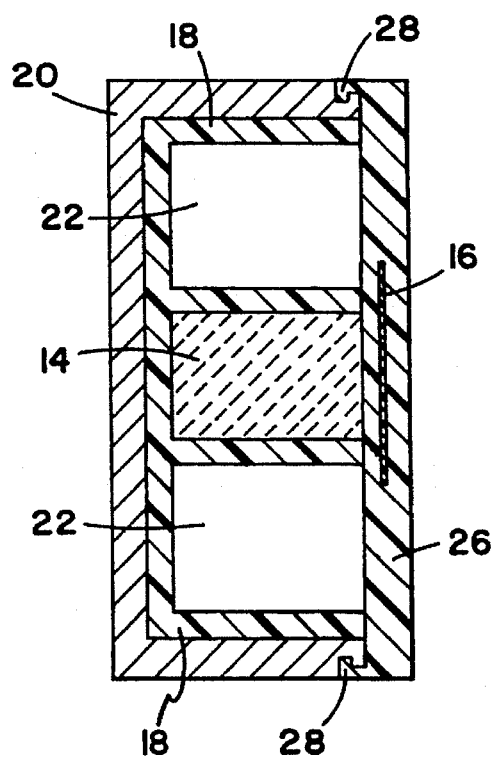
FIG. 2 is a cross-sectional view of the acoustic transducer array of the preferred embodiment of the present invention.

Now turning to FIG. 2, a single piezoelectric ceramic transducer element 14 is positioned in the housing 20 between two baffles 22. The baffles 22 are partitions which prevent acoustical interference between the transducer element 14 and the walls of the housing 20.

Although the preferred embodiment of the present invention illustrates the use of a single ceramic transducer element, it will be understood by those skilled in the art that acoustic arrays generally contain numerous transducer elements. In particular, several transducer elements 14, with a separate piece of PVDF film 16 in front of each transducer element 14, would normally be positioned in the housing 20. However, for the sake of simplicity, only a single transducer element is shown.

The transducer element 14 and baffles 22 are typically isolated in the housing 20 by an acoustically soft material 18, such as CORPRENE®. The face of the array 10 is then covered by an acoustically transparent potting material. A variety of potting materials 26 are available, generally in the form of polymers and rubbers. Potting is performed under vacuum to eliminate bubbles in the potting material 26.

Typically, sufficient potting material 26 is added to cover the baffles 22 and transducer element 14, thus sealing the array by covering their tops with an acoustically transparent window. A slot 28 in the housing 20 is normally added to insure a water-tight seal. After potting, the top of the potting material 26 can be machined to create a smooth surface.

A piece of PVDF film (polyvinylidene fluoride) may be placed on top of the machined surface and covered with another layer of potting material 26, thereby imbedding the PVDF film 16 in the acoustically transparent potting material 26 across the face of the array.

PVDF film 16 is a substantially acoustically transparent piezoelectric material which, when subjected to acoustic waves, generates electrical signals having amplitudes proportional to those waves, and when subjected to electrical signals generates acoustic waves of the same shape as the electric signal. As will be discussed in detail below, by monitoring the voltage generated by the PVDF film 16, it is possible to monitor the acoustic energy transmitted by the acoustic array 10, and by exciting the PVDF 16 with electrical signals originating at test generator 40 it is possible to monitor the receiving sensitivity of the array 10. As also discussed in more detail below, calibration factors determined in the laboratory using known standards can then be used to evaluate array performance.

Figure 3:
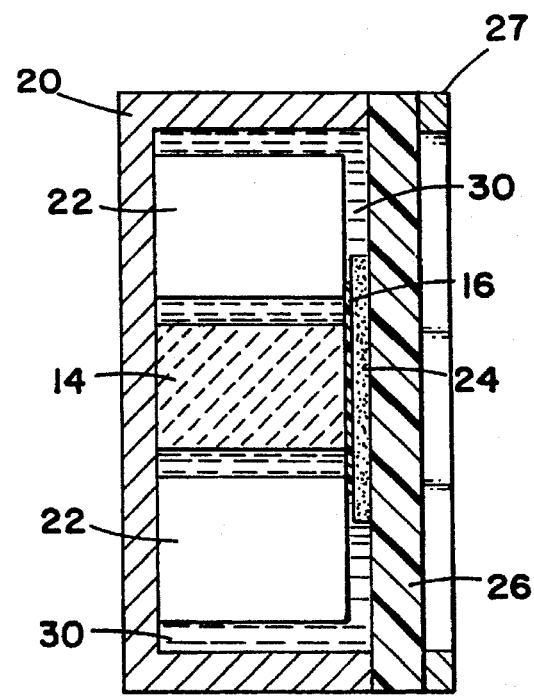
FIG. 3 is a cross-sectional view of a first alternative embodiment of the acoustic array.

FIG. 3 illustrates an alternative embodiment of an acoustic array 10 consistent with the present invention, which can survive submergence to any ocean depth. The baffles 22 and transducer element 14 are normally anchored to the base of the housing 20 by a suitable adhesive. The PVDF film 16 is shown held to the surface of the transducer element 14 by a piece of acoustically transparent open cell urethane foam 24 which is interposed between the PVDF film 16 and the acoustic window 26. A metal bezel 27 with screws 13 (not shown) may be used to hold the acoustic window 26 to the housing 20.

In FIG. 3, the pressure of the urethane foam 24 holds the PVDF film 16 against the transducer element 14 and prevents it from moving. To enable the acoustic array 10 to withstand extreme pressure, oil 30 is typically introduced into the housing 20 to equalize pressure within the array 10 and to prevent the acoustic window 26 from deforming. The urethane foam 24 has large open cells through which the oil 30 can freely flow. The urethane foam 24 operates like a spring to hold the PVDF film 16 in contact with the transducer elements 14 under all ambient pressure conditions. The array 10 is normally vacuum-filled with oil in order to remove all air.

Figure 4C:
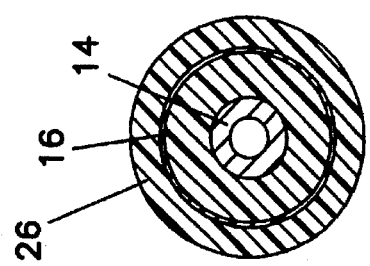
FIG. 4C is a front view of a second alternative embodiment of the acoustic array.
Figure 4B:
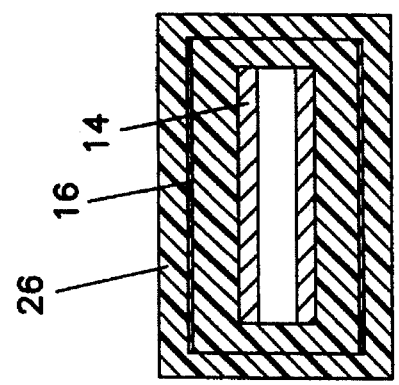
FIG. 4B is a side view of a second alternative embodiment of the acoustic array.
Figure 4A:
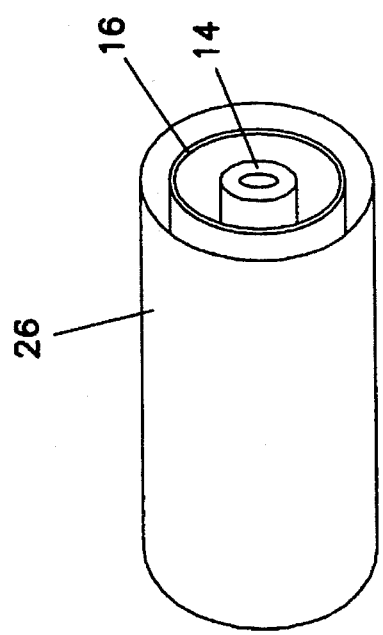
FIG. 4A is a perspective view of a second alternative embodiment of the acoustic array.

A housing, such as is shown in FIGS. 1–3, is not necessary for implementing the present invention. For instance, the array may be composed of a sensitive element surrounded by a waterproof acoustically transparent potting material in which the PVDF may be embedded to surround the sensitive element. This may be implemented, for example, with nested or concentric cylinders, the inner one being the sensitive element and the outer one being the PVDF film. An example of such an embodiment is illustrated in FIGS. 4A–4C.

Figure 5:
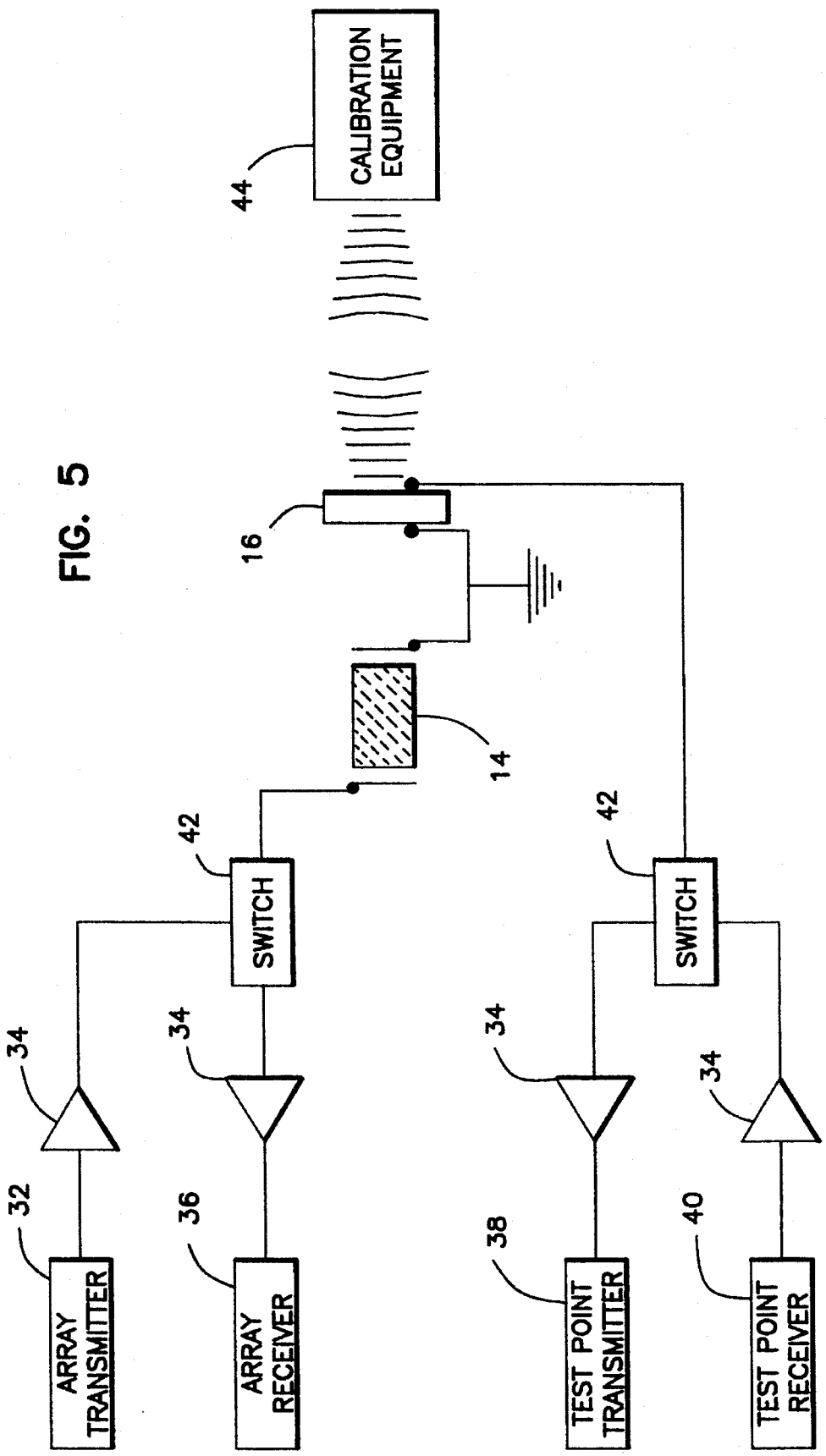
FIG. 5 is a conceptual circuit diagram for using the present invention.

Calibration of the Transducer Array Transmitting Response with PVDF Film in the Receive Mode FIG. 5 is an illustration of a circuit for operating acoustic array 10. It should be noted that the creation of acoustic energy with piezoelectric transducers, such as the transducer element 14 of the present invention, can be over a particular bandwidth and at various power levels. For purposes of calibrating the acoustic array 10 of the present invention, calibration factors typically must be determined for the entire bandwidth and various power levels at which the array will operate. Further, the array 10 normally can be calibrated both as an acoustic projector and as a hydrophone (receiver).

In the transmit mode, an array transmitter 32 generates a voltage which is amplified by amplifier 34 prior to activating the transducer element 14. Acoustic energy projected from the transducer element 14 is received by the PVDF film 16 and after passing through the PVDF film by calibration equipment 44, which is located at a suitable distance from the array 10.

The PVDF film 16 is electrically connected through switch 42 to either test point receiver 38 or test point transmitter 40. Switch 42 is used to select either receiver 38 or transmitter 40 depending on whether the PVDF film 16 is to be in receive or transmit mode.

As discussed above, in the transmit mode the array transmitter 32 and amplifier 34 supply a voltage to the transducer element 14, creating acoustic energy which is measured against known standards by the calibration equipment 44. The acoustic energy from the transducer element 14 also deforms the PVDF film 16, creating a voltage which is detected by the test point receiver 38. The ratio of the voltage detected by the test point receiver 38 to the voltage measured at the external test equipment 44 determines the transmitting calibration factor for a particular level of acoustic energy transmitted. Calibration factors are preferably collected over the entire bandwidth of the array and at different power levels.

Calibration of the Transducer Array Receiving Response Using the PVDF Film as an Acoustic Energy Generator In calibration of the array receiving response, the calibration equipment 44 transmits a known quantity of acoustic energy, which passes through the PVDF film and deforms the transducer element 14. This generates a voltage which is measured by the array receiver 36. This voltage is compared to the one resulting when the PVDF film 16 is energized by test point generator 40 and amplifier 34. The ratio of the voltages so generated corresponds to a receiving calibration factor for the array at the particular level of acoustic energy transmitted by the calibration equipment 44. Again, calibration factors are preferably collected over the entire bandwidth of the array and at different power levels.

The transmitting and receiving calibration factors may also be used for error checking and compensation. For example, if the transducer is used as a part of an active sonar, if the actual level of transmitted acoustic energy is lower than the expected level, the reflection from a target in the sonar's field of view will be correspondingly reduced. If a discrepancy exists, the actual values may be compensated or adjusted according to the calibration factors.

Since the acoustic energy generated by the PVDF film 16 for each voltage level supplied by the test point transmitter 40 is known in relation to the voltage received when the energy was transmitted by the calibration equipment 44, field calibrations of the acoustic array 10 can be performed. Field calibrations involve supplying a known voltage to the PVDF film 16 from the test point transmitter 40. The voltage supplied by the test point transmitter 40 has a corresponding calibration factor, as previously measured by the calibration equipment 44. The ratio of the voltage received by the array receiver 36 is then compared to the voltage supplied by the test point transmitter 40. The difference between this ratio and the calibration factor can be used as a compensation factor for error correction purposes.

Operation of the PVDF Film as an Independent Hydrophone

Since the PVDF film 16 operates as an acoustic receiver over a broader bandwidth than typical ceramic transducers, the PVDF film 16 can be used as an additional receiver or hydrophone, allowing the acoustic array 10 to operate as a multi-spectral sonar receiver. In operation, the voltages received by the array receiver 36 and test point receiver 38 could both be used to analyze the acoustic signature of the target object.

cl Operation of the Array

In actual use, the acoustic array of the present invention typically would operate in both the transmit and receive mode. For example, the transducer element 14 transmits acoustic of a known frequency and power level toward a target object, which is reflected back to the acoustic array 10.

The transmit and receive modes require use of both the transmitting and receiving calibration factors. As discussed above, the transmitted acoustic energy is verified and adjusted according to the transmit calibration factor. The received acoustic energy is likewise verified and adjusted according to the receiving calibration factor. By comparing the quantity acoustic energy transmitted by the acoustic array with the received sensitivity of the array, the absolute value of reflected acoustic energy can accurately be measured.

It will be understood that the present invention is not limited to the examples discussed above, but may be changed or modified without departing from the spirit or scope of the present invention. For example, a plurality of acoustic arrays disclosed in the present invention can be aimed at various angles in a field of view to provide multiple frequency, multiple beam sonar configurations. Further, the present invention may be used to create high accuracy acoustic transducers/receivers for medical or non-destructive testing applications.

What is claimed is:

1. A self-calibrating acoustic array, comprising:

an acoustically transparent material;

an acoustic transducer element at least partially retained within the acoustically transparent material; and a substantially acoustically transparent planar pressure transducer film embedded in the material and located proximate the transducer element, the pressure transducer film comprising means for monitoring acoustic energy transmitted by the transducer element, for transmitting acoustic energy to be received by the transducer element, and for operating as an independent hydrophone in a sonar system.

2. The acoustic array of claim 1 wherein said transducer film monitors acoustic energy transmitted and received by said acoustic transducer and generates acoustic energy to be received by said transducer element.

3. A self-calibrating acoustic array, comprising:

a housing with a plurality of sides defining an interior space, the housing defining an opening in one of the sides;

an acoustic transducer element retained within the housing;

an acoustically transparent window positioned over the opening; and a substantially acoustically transparent planar pressure transducer film located proximate the opening, the pressure transducer film comprising means for monitoring acoustic energy transmitted by the transducer elements, for transmitting acoustic energy to be received by the transducer element, and for operating as an independent hydrophone in a sonar system.

4. The acoustic array of claim 3 wherein the transducer film is embedded in the acoustic window.

5. The acoustic array of claim 3 wherein the transducer film is interposed between the transducer element and the acoustic window.

6. The acoustic array of claim 3 wherein said transducer film monitors acoustic energy transmitted by said acoustic transducer and transmitting acoustic energy to be received on said acoustic transducer.

7. A method for calibrating the transmitting response of an acoustic array comprising the steps of:
   a) locating a substantially acoustically transparent planar pressure transducer film proximate to an acoustic transducer;
   b) energizing said acoustic transducer to transmit acoustic energy;
   c) monitoring said acoustic energy transmitted by said acoustic transducer with said pressure transducer film;
   d) independently measuring the level of transmitted acoustic energy against a standard; and
   e) comparing said acoustic energy received by said pressure transducer film with said energy transmitted by said acoustic transducer as determined by said standard to determine a transmission calibration factor for said acoustic transducer at said measured level of acoustic energy.

8. The method according to claim 7 further including the step of repeating the steps of (a) through (e) of claim 7 for a plurality of levels of acoustic energy, whereby a plurality of corresponding transmission calibration factors are determined.

9. The method of claim 7 further including the step of repeating the steps of (a) through (e) of claim 7 for a band of frequencies of acoustic energy, whereby a band of corresponding frequency-dependant transmission calibration factors are determined.

10. A method for calibrating the receiving response of an acoustic array comprising the steps of:
   a) locating a substantially acoustically transparent planar pressure transducer film proximate to an acoustic transducer;
   b) energizing said pressure transducer film to transmit a particular level of acoustic energy;
   c) receiving said transmitted acoustic energy in said acoustic transducer;
   d) independently energizing an external calibration device to transmit a particular calibrated level of acoustic energy;
   e) receiving said calibrated level of acoustic energy in said transducer; and
   f) comparing the two said signals received at said transducer, one from the said pressure transducer film, and one from the said external calibrated device, to determine a receiving calibration factor at said independently measured level of acoustic energy.

11. The method according to claim 10 further including the step of repeating the steps of (a) through (f) of claim 10 for a plurality of levels of acoustic energy, whereby a plurality of receiving calibration factors are determined.

12. The method according to claim 10 further including the step of repeating the steps of (a) through (f) of claim 10 for a band of frequencies of acoustic energy, whereby receiving calibration factors are determined for a band of frequencies.

13. The method according to claim 10 further comprising:
   g) energizing said transducer film to transmit a particular level of acoustic energy;
   h) receiving said transmitted acoustic energy in said acoustic transducer; and
   i) comparing said received acoustic energy with said acoustic energy transmitted by said transducer film according to said calibration factor.

14. A multi-spectral sonar receiver, comprising:

an acoustic transducer which converts acoustic waves into a corresponding first electrical signal;

a pressure transducer film located proximate the acoustic transducer, the pressure transducer film converting the acoustic waves into a corresponding second electrical signal;

a first receiver coupled to the acoustic transducer for receiving the first electrical signal; and a second receiver coupled to the pressure transducer film for receiving the second electrical signal.

15. The multi-spectral sonar receiver of claim 14 wherein the acoustic transducer and the transducer film are mounted within a housing.

16. The multi-spectral sonar receiver of claim 14 wherein the acoustic transducer is at least partially retained within an acoustically transparent material and the transducer film is embedded within the material.

* * * * *